United States Patent [19]
Swan et al.

[11] Patent Number: 5,812,203
[45] Date of Patent: Sep. 22, 1998

[54] DEFLICKERING AND SCALING SCAN CONVERTER CIRCUIT

[75] Inventors: Philip L. Swan; Edward George Callway, both of Toronto; Lili Kang, Don Mills, all of Canada

[73] Assignee: ATI Technologies Inc., Unionville, Canada

[21] Appl. No.: 657,228

[22] Filed: Jun. 3, 1996

[51] Int. Cl.$^6$ .................................................. H04N 7/01
[52] U.S. Cl. ............................................ 348/446; 348/910
[58] Field of Search ................................. 348/446, 910, 348/581, 607, 447, 441

[56] References Cited

U.S. PATENT DOCUMENTS 4,298,888  11/1981  Colles et al. ........................... 348/446
5,455,028  10/1995  Bishop ................................... 348/446

Primary Examiner—Victor R. Kostak
Attorney, Agent, or Firm—Pascal & Associates

[57] ABSTRACT

A method of scan conversion comprising (a) receiving source data representing a predetermined signal component of respective pixels of successive lines of a non-interlaced display, (b) adding the source data related to vertically adjacent pixels in a set of source lines of the non-interlaced display to form one of an odd and even line of an interlaced display, (c) repeating step (b) for another immediately following set of source lines to form another one of the odd or even line of the interlaced display, and (d) repeating steps (a), (b) and (c) successively to an end of an odd or even field of the interlaced display.

19 Claims, 4 Drawing Sheets

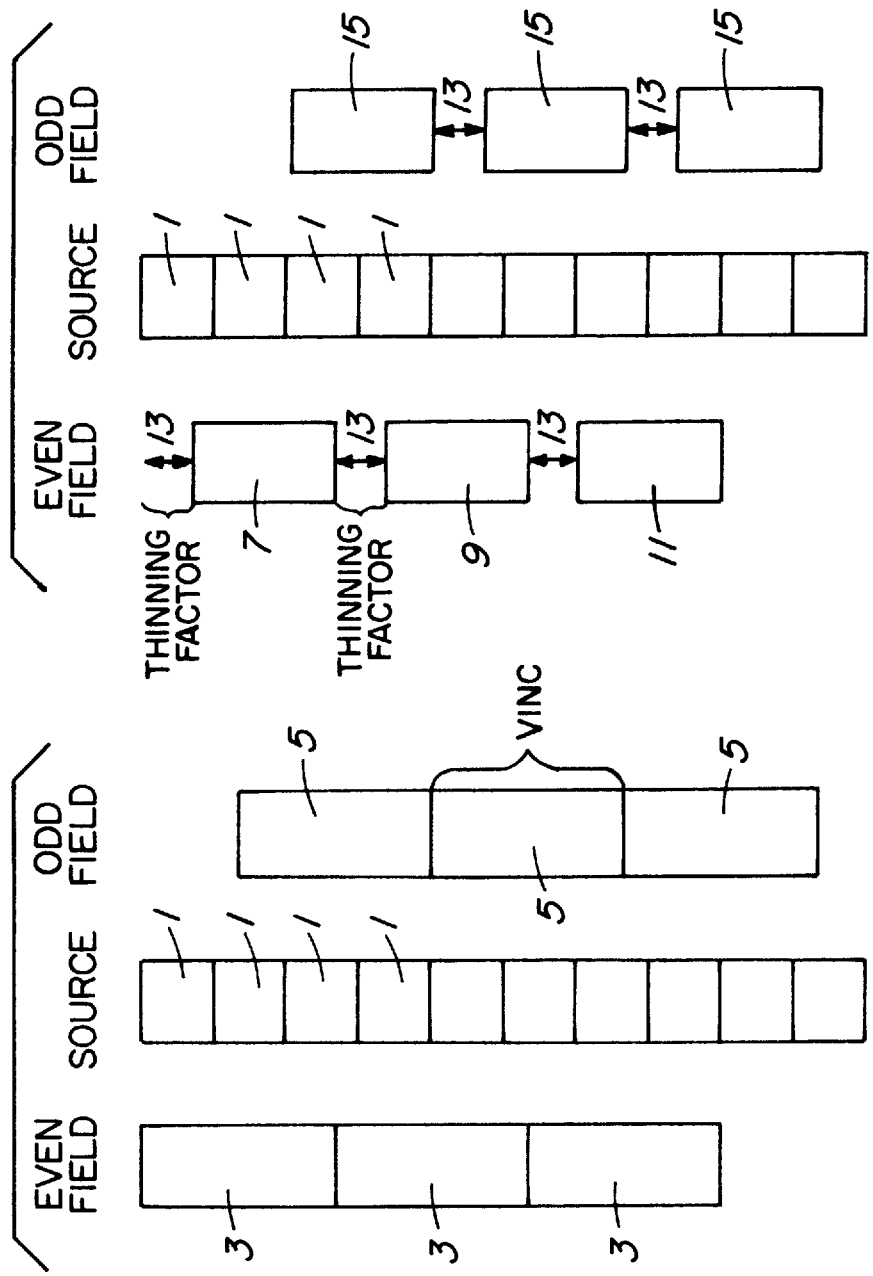

DEFLICKERING AND SCALING SCAN CONVERTER CIRCUIT

FIELD OF THE INVENTION

This invention relates to the field of display processors, and in particular to a scan converter circuit which provides scaling and deflickering.

BACKGROUND TO THE INVENTION

A scan converter converts data representing pixels of a progressive scan image (non-interlaced) into data representing pixels of an interlaced image. This conversion is typically done by blending vertically adjacent pixels of two or three successive non-interlaced lines into a single pixel of an interlaced line. The resulting resolution is less than optimum, and does not provide for vertical scaling of fractional lines up or down with controllable precision.

Deflickering, which involves averaging the luminance (brightness) of pixels of adjacent converted lines, is required but is difficult if the data to be blended is gamma corrected. The reason is that to obtain an average of two luminance levels, the pixel values must be added and the sum halved, and this half value is not equal to half the brightness in gamma corrected NTSC or PAL systems.

Scan conversion is described in the text "Fundamentals Of Interactive Computer Graphics" by J. D. Foley and A. Van Dam, copyright 1982 by Addison-Wesley Publishing Company.

SUMMARY OF THE INVENTION

The present invention is a method which provides for scan conversion with controllable vertical fractional scaling, and for deflickering, ensuring that the intensity of details in the image is not significantly different in the even and odd fields of the interlaced display fields.

In accordance with an embodiment of the invention, a method of scan conversion is comprised of (a) receiving source data representing a predetermined signal component of pixels of successive lines of a non-interlaced display, (b) adding the source data representing vertically adjacent pixels in a set of source lines of the non-interlaced display to form one of an odd and even line of an interlaced display, (c) repeating step (b) for another immediately following set of source lines to form another one of the odd and even lines of the interlaced display, and (d) repeating steps (a), (b) and (c) successively to an end of an odd or even field of the interlaced display.

BRIEF INTRODUCTION TO THE DRAWINGS

A better understanding of the invention will be obtained by considering the detailed description below, with reference to the following drawings, in which:

FIG. 1 illustrates lines of non-interlaced source data and resulting lines of interlaced data in accordance with an embodiment of the present invention, FIG. 2 illustrates lines of non-interlaced source data and resulting lines of interlaced data in accordance with another embodiment of the present invention, FIG. 3 illustrates a flow chart of a basic method of the invention, FIG. 4 is a diagram of interrelated functional blocks for providing either embodiment of the invention, and FIG. 5 illustrates a flow chart of blending control.

DETAILED DESCRIPTION OF EMBODIMENTS OF THE INVENTION

Figure 3:
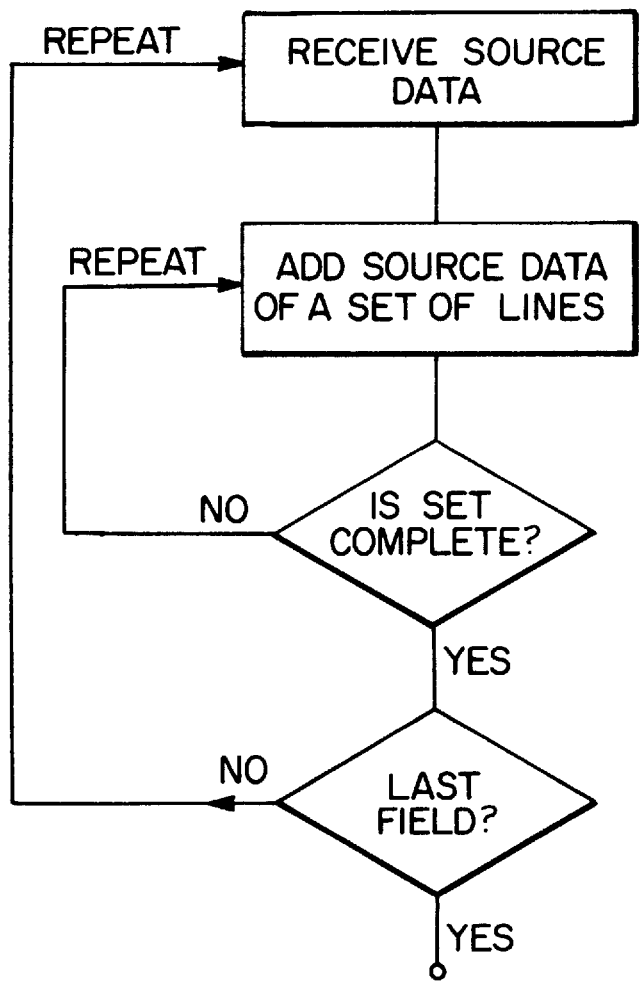

It will be recognized by a person skilled in the art understanding this invention that the present invention can be used to deflicker any of R, G, B or Y, U, V, etc. color signal components. However to avoid redundancy, the description of the embodiments will be directed to processing of a Y (intensity) signal. Any of the U, V, or R, G, B signals can be deflickered using the principles of the invention. Therefore the use of the term intensity or Y in this specification should be construed to correspondingly mean any of U, V, R, G, and/or B components of a color signal.

FIG. 1 illustrates sequences of data (time flowing in the downward direction) representing non-interlaced lines 1 of luminance pixel data. These lines 1 are converted in accordance with an embodiment of the present invention into corresponding even interlaced lines 3 and odd interlaced lines 5 of an interlaced display.

In accordance with an embodiment of the present invention, the even or odd field lines are formed by adding all of the data (at the proper synchronized time) of the source lines that correspond to the time of an interlaced line. Thus in the example shown, the first even interlaced field line 3 is made by adding the data of the first and second and ⅔ of the third non-interlaced field line 1. The next even interlaced field line is made by adding the data of the remaining ⅓ of the third, and the fourth, fifth and ⅓ of the sixth non-interlaced field line, etc.

The odd interlaced field lines are created similarly, except that they are offset in time from the source non-interlaced field lines that create the even field lines. For example, they can be offset from the source non-interlaced field line data by ½ the interval of an even field line.

FIG. 2 illustrates scan conversion in accordance with another embodiment of the invention. In this case, the data of the source lines 1 that is used to form the even and odd interlaced fields is less than in the first embodiment. In the second embodiment, in the example shown about ⅓ of the data in the first source line, all of the data in the second source line, and about ⅔ the data in the third source line is used to form the first even interlaced line field 7. About ⅔ the data in the fourth non-interlaced source line, all of the data in the fifth non-interlaced source line and ⅓ the data in the sixth non-interlaced source line is used to form the second even interlaced line 9. The third interlaced line 11 is formed similarly.

It may be seen that in this embodiment not all of the source line data is used to form the even field lines; it may be said that the even field lines are data deficient by a thinning factor, which is illustrated by gaps 13 in FIG. 2.

The odd field lines 15 are offset from the even lines, formed of non-interlaced line data offset from the data that is used to form the even interlaced lines, and are also data deficient by the thinning factor.

Since not all of the source data is used to form both even and odd interlaced fields, the flicker is not removed as well as in the first embodiment, on certain types of graphics. However, the latter embodiment allows scaling with less loss of vertical scaling resolution than in the first embodiment, and as less data needs to be dealt with, the data signal processing can be faster or less hardware consuming. A thinning factor will improve deflickering on certain patterns when down-scaling. Since the thinning factor is a controllable variable, as will be described below, the tradeoff between the sharpness of vertical detail and flicker removal is controllable with fine granularity.

The embodiment of FIG. 2 can be considered as the embodiment of FIG. 1 but with different control settings.

Figure 4:
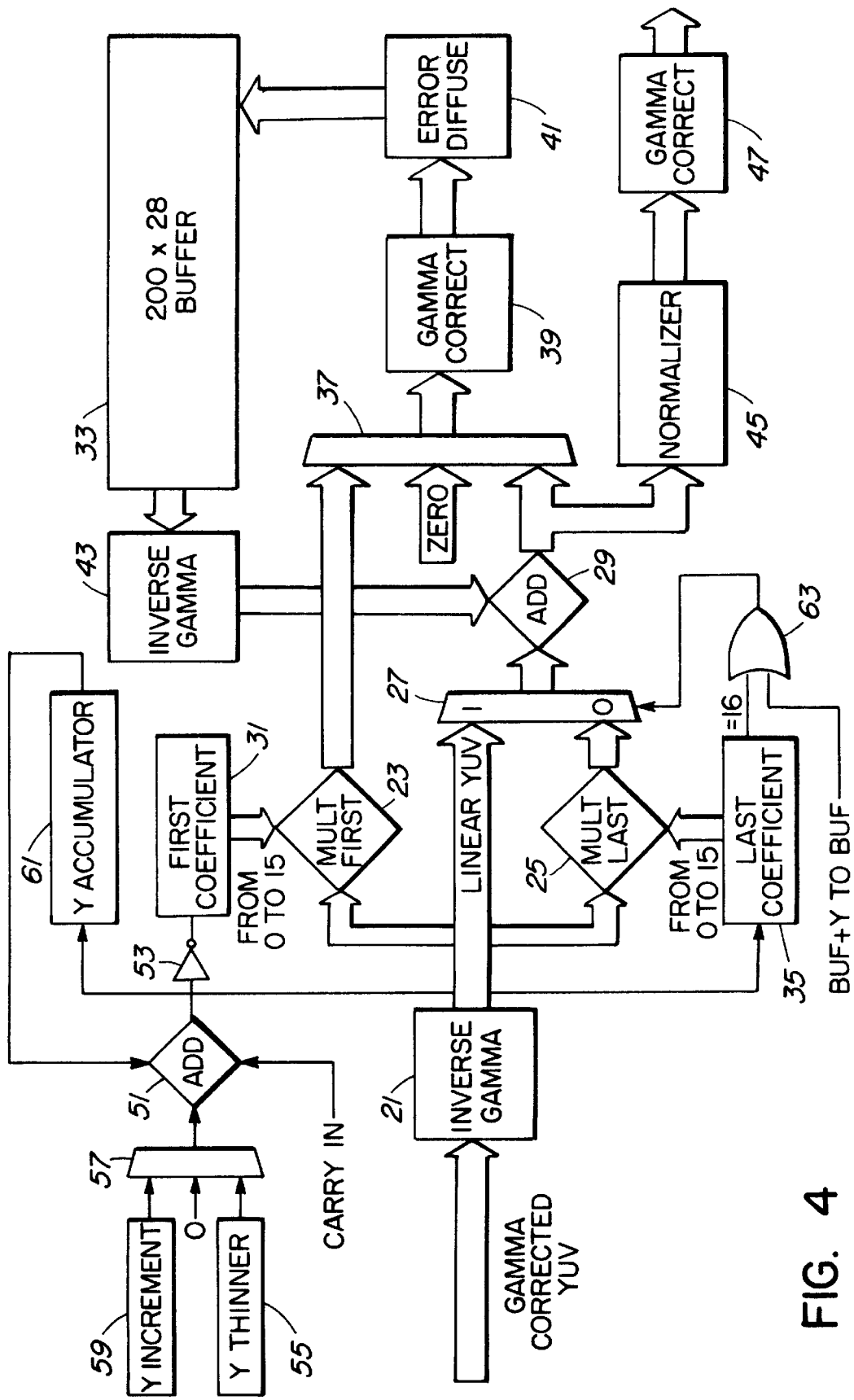

FIG. 4 illustrates a detailed block diagram form of flow chart describing operation of the present invention. As it is described below, operation of the basic flow chart of FIG. 3 will become apparent. It will also be evident that the operation can be translated into and implemented by a structural embodiment containing specific elements for implementing each of the described steps in the method, or can be implemented in a general purpose or special purpose processor.

Data signals (data) for a scan converter are typically input as RGB data from a computer. Circuitry external to this invention (not shown) converts the RGB signal into YUV format, wherein Y represents the luminance part of the signal to be displayed. The Y signal is input to the process described herein. However, any of R, G, B, Y, U or V, etc. could be input to the process. Deflickering the entire color space can then result.

If the luminance input signal is gamma corrected, to optimize the pixels to be displayed on a monitor it is first inverse gamma corrected in the Inverse Gamma step 21. The result is a linear signal, in which the pixel data values linearly represent their brightness. The use of a linear signal can improve the accuracy of vertical filtering.

The linear signal is applied to multipliers 23 and 25. In the event the linear signal represents a non-interlaced line that is fully contained within an interlaced line, it remains the same and it passes through a multiplexer 27 to an adder 29.

Source lines are grouped in sets, wherein the data of each set forms a single interlaced line. If the source line is the first in a set, it is multiplied in multiplier 23 by a first coefficient derived from first coefficient store 31, and the line is stored in buffer 33. If the source line is the last in a set, a last coefficient derived from a last coefficient store 35 is multiplied in multiplier 25 with the data of the last line of the set. The coefficients are used to weigh the partial line data, as will be described later. The multiplied data from multiplier 25 is applied through multiplexer 27 and is added to whatever data is in the buffer 33, in adder 29.

The data from each of the multiplier 23 and adder 29 are selected in multiplexer 37. A zero input is selected when the Y thinning factor is larger, which is an extreme case of the embodiment of FIG. 2. The blended data is optionally gamma corrected by gamma corrector 39, is optionally error diffused in step 41, and is stored in buffer 33. The stored data in buffer 33 is applied to adder 29, in correct pixel synchronization, and is inverse gamma corrected in step 43 prior to application to adder 29 in the event the data had been gamma corrected prior to storage in the buffer 33.

Gamma correctors 39 and 43 are optional and are used primarily to achieve better storage of data in the buffer. Error diffusion is valuable. Positional diffusion ((LSB of Hcount XOR LSB of Vcount) AND LSB of 8 bit data entering 7 bit buffer) was used in a successful embodiment.

The first and last coefficients are data values that represent a factor to decrease the luminance value of fractional source lines, i.e. the first and last lines of a set. For example, the coefficients may range from 0 to 15 wherein the multipliers multiply by (0→15)/16.

As an alternative, multiplier 23 can be located between inverse gamma 43 and adder 29, with a bypass multiplexer. This allows the full data width of the buffer 33 to be used to store the source line with full accuracy.

As another alternative, the same multiplier can be shared for both operations. Multiplier 23 can be removed, and it's function replaced by adding a path from the output of inverse gamma 43 to multiplier 25. Two of the possible three inputs then are multiplexed into the adder. Processing would occur as follows for the even field, FIG. 1:

1) All of Src 1 to buffer
2) Buffer×1+Src 2 to buffer
3) Buffer+Src 3×⅔ to FIFO, All of Src 3 to buffer
4) Buffer×⅓+Src 4 to buffer
5) Buffer×1+Src 5 to buffer
6) Buffer+Src 6×⅓ to FIFO, All of Src 6 to buffer etc.

In the first embodiment, if the data of the first fraction of the last source line is used to form the end of an interlaced line, the remaining fraction of the last source line is used to form the beginning of the next interlaced line. The last and first coefficients respectively can be expressed as y=(n×a) and z=(n×y) respectively, where n represents a predetermined number of luminance increments (15 shown in the example of FIG. 4), and a represents a beginning or end fraction of a source line ending a set.

The above does not hold for the second embodiment, in which the complement of a fraction of the same source line forming the end of an interlaced field line does not form the beginning of the next interlaced line. In this case, the last and first coefficients can be respectively expressed as y=(n×a) and z=(n×b) respectively, wherein n represents a predetermined number of luminance increments, a represents a beginning fraction of a source line ending a set and b represents an end fraction of a source line beginning a set.

The inverse gamma correcting step 21 allows operations to be performed in linear space. While this does not help to make the design structure smaller, failing to inverse gamma correct a gamma corrected signal will result in lower quality deflickering due to incorrect blending of luminance levels.

After step 37, gamma correction can be made for a display prior to error diffusion to allow more optimal use of buffer storage. The output signal from adder 29 is normalized in normalizer step 45, and gamma corrected in gamma correcting step 47. This is done because the source typically contains a fixed number of intensity values (e.g. 128), which requires 7 bits to represent. When inverse gamma correction is performed, more than 7 bits is needed to maintain the accuracy of the intensity (luminance) data. Given the choice of using a buffer capable of storing the extra bits or adding the extra gamma operations, it is preferred to use the extra gamma operations. However, the invention can be implemented without using the extra gamma operations, but will require a larger buffer than the 200×28 bit buffer used in a successful embodiment.

It should also be noted that a source line can be both the first line of the next set of source lines and the last line of the current set of source lines. The present invention can handle both of these cases.

Error diffusion is preferred to be used to reduce the visibility of artifacts that are the result of reducing the number of bits used, in a reduced size data path. However the use of error diffusion is not essential to the present invention.

The number of lines and fractions of lines of a set of source lines to make up an interlaced line determines the vertical scaling. The values of the first and last coefficients form the deflickering control for the case of complementary first and end line fractions, i.e. the first embodiment. The values of the first and last coefficients and the thinning factors form the deflickering control as well as the sharpness of vertical detail control for the case of non-complementary first and end line fractions, i.e. the second embodiment.

Returning to FIG. 4, the first and last coefficients are received from adder 51 and are stored in stores 31 and 35. The output signal of adder 51 is increased by one (via the carry in) and is provided to the last coefficient store 35. At a different time, the adder with no carry in is applied via inverter 53 to provide its inverse (complement minus one) to first coefficient store 31. A Y thinner variable provided from store 55 is applied through multiplexer 57 to an input of adder 51. A Y increment variable is provided via store 59 through multiplexer 57 to adder 51. A 0 constant is also provided to multiplexer 57; either the Y increment or Y thinner variable or 0 passes through multiplexer 57 to adder 51. The output of adder 51 is applied through a Y accumulator 61, the output of which is applied to another input of adder 51. A carry value is also applied to another input of adder 51, derived from Y accumulator 61.

The Y thinner variable is used to indicate the degree to which the data of the source lines incorporated by an interlaced line should be smaller. Preferably the size reduction is taken from the top of the region, but it could also be taken from the bottom, or partly from both top and bottom.

A buffer+Y to buffer variable is input to an input of OR gate 63, another input to which a data value from the last coefficient store 35 is also applied. The output of the AND gate is applied to the control input of multiplexer 27. The buffer+Y to buffer variable thus controls when multiplexer 27 changes from outputting the source line data that is completely contained within a scanned line to outputting the fraction of a line data of the last line of a set, to the adder 29, and thus controls the size of a set of source lines. The buffer +Y variable thus controls the scaling, since both the numbers of source lines and the start and end line fractional values of a set can be controlled. Due to the controllable number of lines in a set, extreme downsizing of the number of lines in a display can be obtained.

Thus adder 51 is shared in the calculation of 3 values, first coefficient, last coefficient, and lastly Y accumulator. These values are recalculated between the second last and last source line of each set. Last coefficient is the value of the Y accumulator +1. In FIG. 4, the "plus one" is achieved using the "carry in" for this operation. It was found to be desirable to have a higher precision for the Y accumulator than for the coefficients. Instead of using the "carry in" pin to perform the "plus one" operation, 'n' of the most significant bits of (Y accumulator+0)+1 to make the 'n+1' bits of last coefficient is preferred to be used.

First coefficient is calculated on a different clock edge and is the inverse of ('n' of the most significant fractional bits of (Y accumulator+Y increment)).

After first and last coefficient has been calculated, the Y accumulator value is updated. It is ('n' of the most significant fractional bits of (Y accumulator+Y increment)).

As an alternative, the coefficient values of a table can be loaded and software can be used to calculate a pattern of values optimized for a particular scaling. While buffer size can limit the choice of scaling ratios, more elaborate algorithms can be used to calculate the coefficients.

It should be noted that the scaling function can be used either with or with no deflickering or with varying degrees of deflickering.

The present invention can accommodate different gamma factors, or no gamma correction need be used if not necessary in the application. As noted earlier, error diffusion need not be used, if the application can tolerate it. The thinner variables also need not be used, if not needed in an application.

In addition, lines can be thinned by ceasing the accumulation of source lines early, as distinct from starting the accumulation of source lines late as is done in the program below and is shown in FIG. 2. A combination of both cases can be used.

It has been observed that some systems use some form of line application or line dropping in a vertical scaling algorithm. In such cases there may be missing or faint horizontal lines in an image of a grid, discontinuities in diagonal lines, and/or blinking horizontal lines during vertical motion. The present invention can avoid these undesirable effects by every line of the image being equally represented in a) both fields individually of the interlaced target image, and b) both fields together (i.e. the frame) of the target image. It is also possible in the present invention to scale with varying degrees of lost source content in either the individual fields or the whole frame such that the lost content is evenly and finely distributed throughout the field/frame with the distribution granularity the same as the field or frame resolution.

It should also be noted that the normalizing component can be used as a brightness control on the emerging data. The normalization multiplier function can be performed on the source data prior to being merged, whereby the normalizer is placed after gamma corrector 21. The normalization multiplier function can be performed on the source data prior to being merged and gamma corrected, wherein the normalizer is placed before gamma corrector 21.

Figure 5:
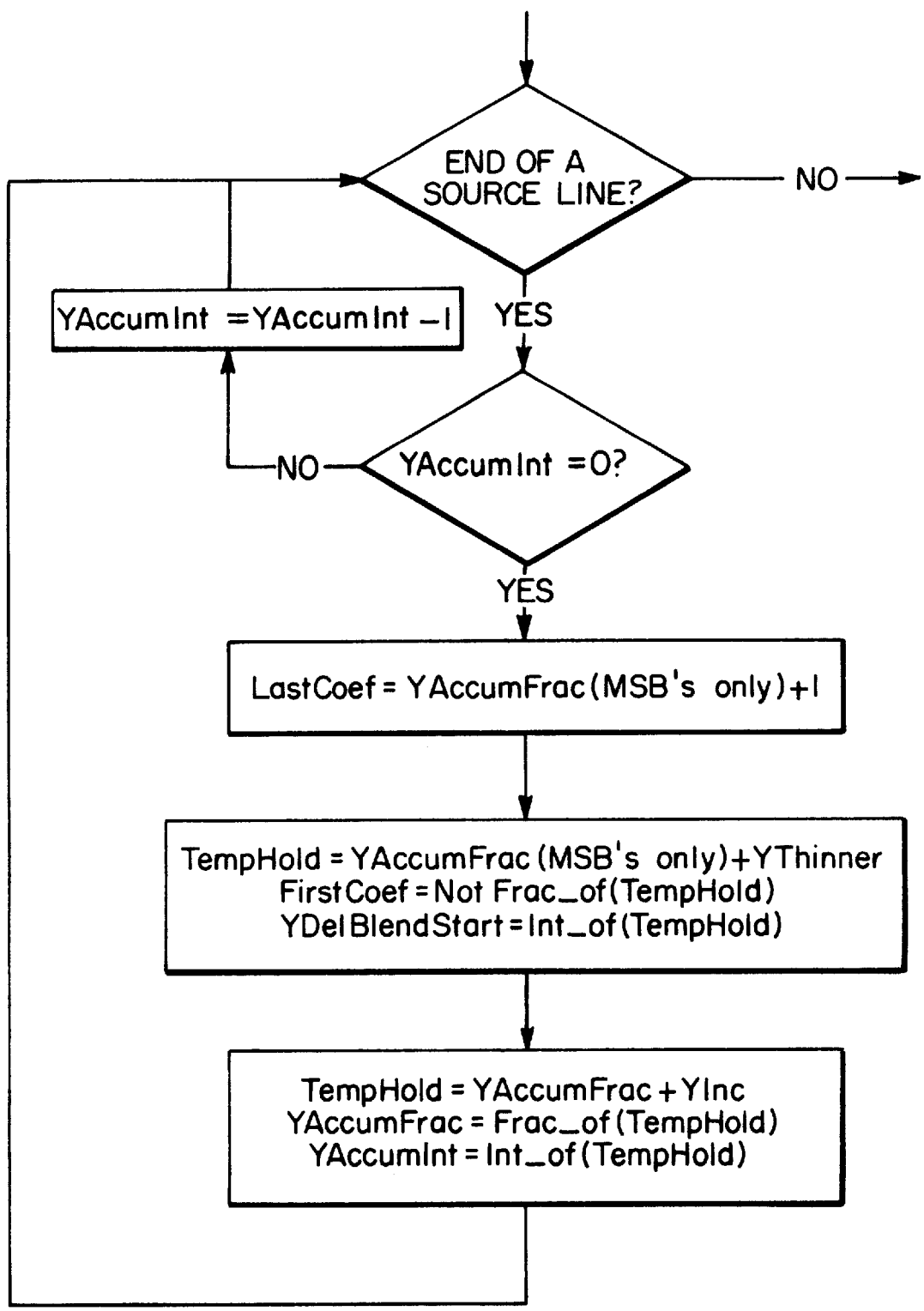

The program attached hereto as Appendix A can be used to operate the invention, in a processor or state engine, and indicates how the coefficients are determined. The program attached hereto as Appendix B, and the corresponding flow chart of operation shown in FIG. 5, indicate part of the code flow for controlling blending.

A person understanding this invention may now conceive of alternative structures and embodiments or variations of the above. All those which fall within the scope of the claims appended hereto are considered to be part of the present invention.

---

APPENDIX A

```
DECLARE FUNCTION Dec! (a!)
CONST True = -1
CONST False = 0
CONST BitsInFrac = 4
SCREEN 12
CLS
YThinner = 0
YInc = INT(2.2 * 2 ^ BitsInFrac)     'Downscaling: 2.2 source lines per
destination line
YInc = INT(1.8 * 2 ^ BitsInFrac)     'Upscaling: 1.8 source lines per
destination line
DO
      BufPlusYToBuf = True
      BufPlusYxLCToFIFO = False
      IF YAccumInt = 0 THEN
            LastCoefficient = YAccumFrac + 1
            FirstLineDone = False
            FirstCoefficient = (((NOT (Dec(YAccumFrac +
            YThinner)))) AND
(2   BitsInFrac - 1))
            YAccumInt = (YAccumFrac + YInc) \ 2 ^ BitsInFrac
            UVAccumInt = INT(YAccumFrac + (YInc \ 2))
            YDelBlendStrt = (YAccumFrac + YThinner)
            \ 2 ^ BitsInFrac
            BufPlusYxLCToFIFO = True
            BufPlusYToBuf = False
            YAccumFrac = Dec(YAccumFrac + YInc)
      END IF
      IF BufPlusYxLCToFIFO THEN
            'Add the buffer to the source line times a coefficient of
"LastCoefficient"
            r = r + 1: IF r >= 28 THEN r = 1
            'Output the line
            LOCATE r, 70
            PRINT b$ + HEX$(LastCoefficient)
      END IF
```

APPENDIX A

```
'Control of "ToBufMux"
IF FirstLineDone THEN
        'Add the source line with a coefficient of 1
        b$ = b$ + CHR$ (219)
        BufPlusYToBuf = True
        YxFCToBuf = False
ELSE
        IF YDelBlendStrt = 0 THEN
                'Add the source line times a coefficient of
"FirstCoefficient"
                FirstLineDone = True
                b$ = HEX$(FirstCoefficient)
                YxFCToBuf = True
                BufPlusYToBuf = False
        ELSE
                'This source line has a coefficient of zero, so do
nothing with it here.
                b$ = "0"
                YxFCToBuf = False
                BufPlusYToBuf = False
                YDelBlendStrt = YDelBlendStrt - 1
        END IF
END IF
'Determine if it is time to send out the UV (ignore for patent) ←
IF UVAccumInt = 0 THEN
        IF (YAccumInt = 0 OR YAccumInt = 1) THEN
                UVToFIFO = True
ELSE
        UVAccumInt = UVAccumInt - 1
        END IF
        YAccumInt = YAccumInt - 1
LOOP
FUNCTION Dec (a)
        Dec = a MOD (2 +e,crc +ee BitsInFrac)
END FUNCTION
```

APPENDIX B

```
if (End of Source line) {
    if ((YAccumInt==0) || (iDEL_SYNC_LINE && !sub_bit(iD_FCOUNT, 0))) (
        switch (sub_range(iD_HCOUNT, 1, 0)) {
            case 0: {
                NLastCoef = {bitvector6downto0) (bit_cat(0, sub_range(YAccumFrac, FRAC_BITS-1, FRAC_BITS - MULT_BITS), 6) + 1);
            } break;
            case 1: {
                TempFCSum = (bitvector7downto0)(bit_cat(00, sub_range(YAccumFrac, FRAC_BITS-1, FRAC_BITS - MULT_BITS), 6) bit_cat(iY_THINNER, 0, 1));
                NFirstCoef = (bitvector5downto0)sub_range(~TempFCSum, MULT_BITS-1, 0);
                NYDelBlendStrt = (bitvector1downto0)sub_range(TempFCSum, 7, MULT_BITS);
                NAccumulationInitiated = 0;
            } break;
            case 2: {
                if (iDEL_SYNC_LINE && !sub_bit(iD_FCOUNT, 0)) {
                    NYAccumFrac = (bitvector13downto0)bit_cat(iY_ACCUM_INIT, 0, FRAC_BITS-5);
                    NYAccumInt = 0;
                }
                else {
                    TempYAccumSum = YAccumFrac + iY_INC;
                    NYAccumFrac = (bitvector13downto0)sub_range(TempYAccumSum, FRAC_BITS-1, 0);
                    NYAccumInt = (bitvector1downto0) (sub_range(TempYAccumSum, FRAC_BITS+1, FRAC_BITS) - 1);
                }
                NBufPlusYxLCToFIFO = 1;
                NoUSE_THIS_Y_LINE = 1;
                if (sub_bit(iY_ACCUM_INIT, 0)) {
                    NoUSE_THIS_UV_LINE = 1;
                }
            } break;
        }
    }
    else {
        if ((sub_range(iD_HCOUNT, 1, 0))==2) {
            NBUfPlusYxLCToFIFO = 0;
            NoUSE_THIS_Y_LINE = 0;
            if (sub_bit(iY_ACCUM_INIT, 0)) {
                NoUSE_THIS_UV_LINE = 0;
            }
            NYAccumInt = YAccumInt - 1;
        }
    }
}
```

-continued

APPENDIX B

```
// Determine when to begin the blend
if (sub_range(iD_HCOUNT, 1, 0)==2} {
    NiD_VCOUNT_LBIT = !iD_VCOUNT_LBIT;
    if (AccumulationInitiated) {
        NYxFCToBuf = 0;
        NBufPlusYToBuf = 1;
    }
    else {
        if (YDelBlendStrt==0)) {
            NYxFCToBuf = 1;
            NBufPlusYToBuf = 0;
            NAccumulationInitiated = 1;
        }
        else {
            NYxFCToBuf = 0;
            NBufPlusYToBuf = 0;
            NYDelBlendStrt = YDelBlendStrt - 1;
        }
    }
}
if ((sub_range(iD_HDCOUNT, 1, 0)==3) && !sub_bit(iY_ACCUM_INIT, 0)) {
    if (YAccumInt==0) {
        // Advanced warning indicates that YAccumInt will become 0
        NoUSE_THIS_UV_LINE = 1;
    }
    else {
        NoUSE_THIS_UV_LINE = 0;
    }
```

I claim:

1. A method of scan conversion comprising:

(a) receiving source data representing a predetermined signal component of respective pixels of successive lines of a non-interlaced display, (b) adding said source data related to vertically adjacent pixels in a set of source lines of said non-interlaced display to form one of an odd and even line of an interlaced display, (c) repeating step (b) for another immediately following set of source lines to form another one of the odd and even lines of the interlaced display, and (d) repeating steps (a), (b) and (c) successively to an end of an odd or even field of the interlaced display, in which the beginning fraction of an end source line of a set and the end fraction of a beginning source line of an immediately following set add up to one.

2. A method as defined in claim 1 in which the number of source lines in each successive set of source lines is approximately the same.

3. A method as defined in claim 1 including scaling said lines of said non-interlaced display with varying amount of lost source data in both of odd and even fields individually of said interlaced display to distribute said lost source data evenly and finely throughout said fields with distribution granularity the same as resolution of each field.

4. A method as defined in claim 1 including scaling said lines of said non-interlaced display with varying amounts of lost source data in both of odd and even fields together of said interlaced display to distribute said lost source data evenly and finely throughout said fields with distribution granularity the same as resolution of a frame formed of said fields.

5. A method as defined in claim 1, said source line being comprised of substantially all data of source lines completely contained in a line of said interlaced display plus at least one of an end fraction of a beginning source line and a beginning fraction of an end source line of said set of source lines in the event a beginning line or complete end line of said source lines within the set is not completely contained within the even interlaced line.

6. A method as defined in claim 1 further including repeating step (d) with sets of source lines, each set of which has an equal number of lines as a representative set of source lines, offset from said representative set of source lines by half the number of lines in said number of lines, to form the other of odd and even lines of the interlaced display.

7. A method of scan conversion comprising:

(a) receiving source data representing a predetermined signal component of respective pixels of successive lines of a non-interlaced display, (b) adding said source data related to vertically adjacent pixels in a set of source lines of said non-interlaced display to form one of an odd and even line of an interlaced display, (c) repeating step (b) for another immediately following set of source lines to form another one of the odd and even lines of the interlaced display, and (d) repeating steps (a), (b) and (c) successively to an end of an odd or even field of the interlaced display, in which said signal component is comprised of luminance data of entire continuing beginning and end source lines in said steps (b) and (c).

8. A method as defined in claim 7 in which the luminance data is linear, and including carrying out step (b) by maintaining the values of the source data in the event substantially all data of a line of source data is fully contained in a line of the interlaced display, and multiplying data of said end and beginning fractions of source lines by first and last coefficients respectively, applying the multiplied data to a buffer, and adding contents of the buffer, at a time synchronized with a successive interlaced line, to the multiplexed data of said end fraction and said fully contained line to form a premerged signal.

9. A method as defined in claim 8 including normalizing said premerged signal and gamma correcting the normalized sum to provide a luminance component of a display signal.

10. A method as defined in claim 8 in which said last and first coefficients are y=(n×a) and z=(n×y) respectively, wherein n represents a predetermined number of luminance increments and a represents a beginning or end fraction of a source line ending a set of source lines.

11. A method as defined in claim 8 including using luminance data of non-continuous fractional beginning and end source lines in steps (b) and (c).

12. A method as defined in claim 10 in which said last and first coefficients are y=(n×a) and z=(n×b) respectively, wherein n represents a predetermined number of luminance increments, a represents a beginning fraction of a source line ending a set of source lines and b represents an end fraction of a source line beginning a set of source lines.

13. A method as defined in claim 10 in which the coefficients of each set of source lines for each even interlaced line are different and in which the coefficients of each set of source lines for each odd interlaced line are different.

14. A method as defined in claim 8 including gamma correcting the multiplexed data before storing it in said buffer, and inverse gamma correcting the contents of the buffer prior to adding it to said sum of the multiplied data.

15. A method as defined in claim 14 including receiving data corrected input data signals, and inverse gamma correcting said input data signals to produce said received source data.

16. A method as defined in claim 1, further including equally representing said source data in both individually odd and even fields of said interlaced display.

17. A method as defined in claim 9, including using a normalizing component as a brightness control on said luminance component.

18. A method as defined in claim 8, including normalizing said source data prior to forming said premerged signal and subsequently gamma correcting the normalized sum.

19. A method as defined in claim 8, including gamma correcting the source data, and subsequently normalizing the gamma corrected source data.

\* \* \* \* \*